United States Patent
Richter et al.

(10) Patent No.: US 8,678,656 B2
(45) Date of Patent: Mar. 25, 2014

(54) ARTICULATED UNIT AND METHOD FOR LUBRICATING AN ARTICULATED UNIT

(75) Inventors: Thomas Richter, Damme (DE); Arnold Middelkampf, Badbergen (DE); Siegfried Rahe, Belm (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 651 days.

(21) Appl. No.: 12/328,321

(22) Filed: Dec. 4, 2008

(65) Prior Publication Data

US 2009/0152834 A1 Jun. 18, 2009

(30) Foreign Application Priority Data

Dec. 12, 2007 (DE) .......................... 10 2007 060 287

(51) Int. Cl.
*F16C 11/06* (2006.01)
(52) U.S. Cl.
USPC ......................................... 384/213; 403/135
(58) Field of Classification Search
USPC ................... 384/213; 403/125, 133, 135, 140
See application file for complete search history.

(56) References Cited

U.S. PATENT DOCUMENTS

| 3,411,815 A | * | 11/1968 | Sullivan, Jr ................... 403/138 |
| 3,787,127 A | * | 1/1974 | Cutler ........................... 403/133 |
| 4,003,666 A | * | 1/1977 | Gaines et al. ................... 403/36 |
| 5,011,320 A | * | 4/1991 | Love et al. ..................... 403/132 |
| 5,368,408 A | * | 11/1994 | Shimizu et al. ............... 403/140 |

FOREIGN PATENT DOCUMENTS

| DE | 40 19 997 A1 | 1/1991 |
| DE | 4419954 A1 | 12/2008 |

* cited by examiner

*Primary Examiner* — William C Joyce
(74) *Attorney, Agent, or Firm* — Christa Hildebrand; Cheryl F. Cohen

(57) ABSTRACT

An articulated unit for a motor vehicle with a housing (1) and a link pin (2) supported in the housing (1), and a bearing shell (4) disposed between the housing (1) and a bearing section (3) of the link pin (2), with the bearing shell (4) supported with its outer surface (5) at least in sections in the housing (1) and having on its inner surface (6) facing the bearing section (3) of the link pin (2) recesses (7) for a lubricant. The bearing shell (4) has at least one opening (8) which extends through the bearing shell (4) from the inner surface (6) to the outer surface (5) and forms a flow channel. A method for lubricating an articulated unit is presented, wherein the bearing shell (4) having elastic compliance produces during the relative movement of the link pin (2) in the housing (1) a pumping action, which enables distribution of the lubricant via the lubricant channel system.

16 Claims, 2 Drawing Sheets

ARTICULATED UNIT AND METHOD FOR LUBRICATING AN ARTICULATED UNIT

BACKGROUND OF THE INVENTION (1) Field of the Invention

The invention relates to an articulated unit for a motor vehicle with a housing and a link pin supported in the housing and a bearing shell disposed between the housing and a bearing section of the link pin, with the bearing shell supported with its outer surface at least in sections in the housing and having on its inner surface facing the bearing section of the link pin recesses for a lubricant, and a method for lubricating an articulated unit.

(2) Description of Related Art

DE 44 19 954 A1 discloses an articulated unit of the aforedescribed type for a motor vehicle, wherein the articulated unit described in the publication shows a ball joint for a motor vehicle. This ball joint has a housing and a link pin supported in the housing, as well as a bearing shell disposed between the housing and the bearing section of the link pin, wherein the bearing shell is supported with its outer surface, at least in sections, in the housing. The bearing shell has recesses for a lubricant, so-called "lubricant grooves," on the inner surface facing the bearing section of the link pin which is formed as an articulated ball. The recesses disclosed in the document are implemented as lubricant grooves with a groove structure and are intended to distribute the lubricant in the articulated unit so as to optimize the sliding friction between the bearing section of the link pin and the bearing shell. The groove-shaped recesses disposed in the inner surface of the bearing shell create a kind of lubricant reservoir.

Compared to conventional ball joints, articulated units of the type the described in DE 44 19 954 A1 exhibit under normal operating conditions significant advantages in lubricating the components moving relative to one another. However, it has been observed that in particular for smaller, high-frequency movements of the link pin within the housing, the lubricant disposed in the bearing shell is pressed out of the support region of the bearing shell, thereby creating dry friction which is formed at least partially between the bearing section of the link pin and the bearing shell. In this embodiment, the lubricant in the articulated unit escapes through a vent bore located in the center of the bearing shell into a cavity present in the housing. However, the lubricant in this cavity is then no longer available for the components of the articulated unit that move relative to one another, because there is no return path for the lubricant to the region of the surfaces that need to be lubricated, so that lubrication is no longer possible.

An extended idle time also poses a problem for articulated units, because a high initial breakaway torque is then formed, because of due to the lack of joint movement, the lubricant disposed between the bearing section of the link pin and the inner surface of the bearing shell is pressed out of the contact region.

BRIEF SUMMARY OF THE INVENTION

It is therefore an object of the invention to provide an articulated unit for a motor vehicle, wherein supply of a lubricant the to the components of the articulated unit that move relative to one another is improved over conventional embodiments. In particular, the produced unit should have a simple structure and low manufacturing costs. A method for lubricating the components of the articulated unit that move relative to one another is also provided.

The invention attains this object with the features of the independent claims. Additional embodiments of the invention are recited in the dependent claims.

An articulated unit for a motor vehicle with a housing and a link pin supported in the housing, and a bearing shell disposed between the housing and a bearing section of the link pin, with the bearing shell supported with its outer surface at least in a section in the housing and having recesses for a lubricant on its inner surface facing the bearing section of the link pin, has been modified by the invention in that the bearing shell has at least one opening which extends through the bearing shell from the inner surface to the outer surface and forms a flow channel.

The invention describes a simple embodiment of an articulated unit which can be produced at low cost. No additional components are required. The bearing shell was provided with at least one opening which extends completely through the bearing shell. This approach enables a lubricant to circulate between the inner surface and the outer surface of the bearing shell, so that a lubricant is optimally supplied to the articulated unit under any operating condition. The pumping action produced by the relative movement of the mutually movable joint components inside the articulated unit transports the lubricant present in the articulated unit. This effectively and permanently prevents the lubricant film between the movable components from tearing off, which has been identified as a disadvantage with conventional solutions. This prolongs the service life of an articulated joint constructed in this manner compared to conventional joints several times over.

According to a first embodiment of the invention, the opening, which connects the inner surface with the outer surface of the bearing shell in form of a flow channel, may be a bore. Advantageously, this opening implemented as a through-bore through the bearing shell and the recesses formed on the inner surface and/or the outer surface of the bearing shell form common components of a lubricant channel system of the bearing shell and hence represent lubricant grooves. This lubricant channel system optimizes distribution of the lubricant within the articulated unit and permanently and effectively prevents the lubricant film from tearing off. The lubricant permanently circulates within the moving articulated unit as a result of the relative movement of the components, in particular as a result of a relative axial movement along the longitudinal axis of the undeflected link pin. Fresh lubricant is thereby continuously supplied to the different bearing sections. Moreover, the lubricant residing in the lubricant channel system is not pressed out of the regions to be lubricated even when the articulated unit is at rest, and is therefore always available.

According to another embodiment of the invention, the articulated unit includes at least one lubricant reservoir disposed in the housing or as a part of the bearing shell. In the simplest case, this embodiment of the invention can be implemented by using as lubricant reservoirs those cavities that already exist in the housing. Because the recesses already exist in the bearing shell, only a flow-conducting connection must be provided between these lubricant reservoirs and the recesses. The lubricant caused to flow by the relative movement of the components is pumped through the recesses and the openings in the bearing shell.

Not only the cavities already disposed in the housing can form lubricant reservoirs, but additional cavities can be provided in the bearing shell. The lubricant required in the articulated unit can then be introduced from the cavities, which are connected with the recesses and opening, i.e. the lubricant channel system, in the aforedescribed manner.

To implement the aforedescribed approach for a permanent flow of the lubricant within the articulated unit, it is proposed to connect the lubricant channel system with the lubricant reservoir, as already described above.

The inventors have observed another advantageous effect with the solution provided by the invention. It was inferred from a large number of experiments that a problem can surface in many articulated units, if air inclusions remain in the lubricant after installation of the articulated unit. There is a risk that air pockets remain in the lubricant between the surfaces of the bearing section of the link pin and the inner surface of the bearing shell facing the link pin. When these components move relative to one another, these microscopically small air volumes may be enclosed and compressed so as to cause a sort of micro-explosion in the contact region, which causes the air to escape and to be released. The associated force exerted on the bearing shell and the bearing section of the link pin can cause premature wear, which may ultimately destroy the articulated components during the service life of the articulated unit. This phenomenon can also be effectively counteracted with the approach of the invention. Air inclusions which may exist in the lubricant, are transported away by the lubricant channel system. The lubricant channel system therefore performs a venting function for the articulated unit.

According to a particularly simple embodiment of an articulated unit of the invention, the bearing shell or the housing have at least one membrane-shaped section with a small, elastically deformable cross-section. This section can serve as a seal, which can be opened, for part of the lubricant reservoir closed by the section. The lubricant reservoir is hence at least partially closed by the membrane-shaped section. The lubricant residing in the lubricant reservoir is available when the articulated components are moved relative to one another. The membrane-shaped elastically deformable section then performs an opening motion and supplies the lubricant residing in the lubricant reservoir to the components that move relative to one another. The membrane-shaped elastically deformable section therefore performs a valve function.

According to another embodiment of the invention, elastically compliant inserts can be placed in the articulated unit and/or the bearing shell. These elastically compliant inserts enable a controlled displacement of the components of the articulated unit, thereby effectively preventing premature wear and potentially destruction of the articulated unit. In addition, significant improvements in the bearing characteristics were observed.

The inserts can be made of an elastomeric material and can be loosely inserted, or example as simple, low-cost circular ring elements, in a free space between the housing and the outer surface of the bearing shell. This also significantly simplifies the installation of the inserts.

In another embodiment for providing inserts in the articulated unit, the inserts may be made of a material which can be transformed into the liquid state by heating and which can be vulcanized or spray-coated on the bearing shell and/or the housing. The inserts having these elastic properties can then be created already during production of the bearing shell or the housing, respectively, thereby completely eliminating ensuing installation costs. This significantly simplifies the structure of an articulated unit with inserts.

A bearing shell of the type used in an articulated unit according to the present invention can also be made in a conventional manner of an elastically deformable plastic material.

It is also contemplated within the context of the invention to form the bearing shell of several parts.

According to a particular embodiment of the articulated unit according to the invention, the articulated unit is a ball joint for a motor vehicle and the bearing section of the link pin is an articulated ball.

According to the method of the invention for lubricating an articulated unit, the bearing shell which is elastically deformable or is compliantly supported produces during the relative movement of the link pin a pumping action, which enables distribution of the lubricant via the lubricant channel system In a preferred method step, the mutually movable components perform a relative axial motion in that the bearing shell which is elastically deformable or is compliantly supported produces a pumping action as a result of a relative movement in the direction of the longitudinal axis of the undeflected link pin, which enables distribution of the lubricant via the lubricant channel system.

As already mentioned, a pumping action can be produced by the relative movement of the components of the articulated unit which continuously circulates the lubricant within the articulated unit. The movable components of the articulated unit are thereby continuously supplied with the lubricant required for lubrication. Because the lubricant is circulated, fresh lubricant is always supplied to the contact regions. The service life of articulated units constructed in this manner is significantly longer than that of conventional devices. In addition, the pumping action can significantly improve the venting function of the articulated unit.

BRIEF DESCRIPTION OF THE SEVERAL VIEWS OF THE DRAWING(S)

The invention will now be described in more detail with reference to the appended drawings. The illustrated embodiments do not limit the scope of the illustrated variants, but are provided only to explain the principle of the invention. To illustrate the functionality of the invention, only simplified schematic diagrams are shown in the Figures, whereby components or elements not important for the invention have been omitted. However, this does not mean that such components or elements are not present in the solution according to the invention.

DETAILED DESCRIPTION OF THE INVENTION

Figure 1:
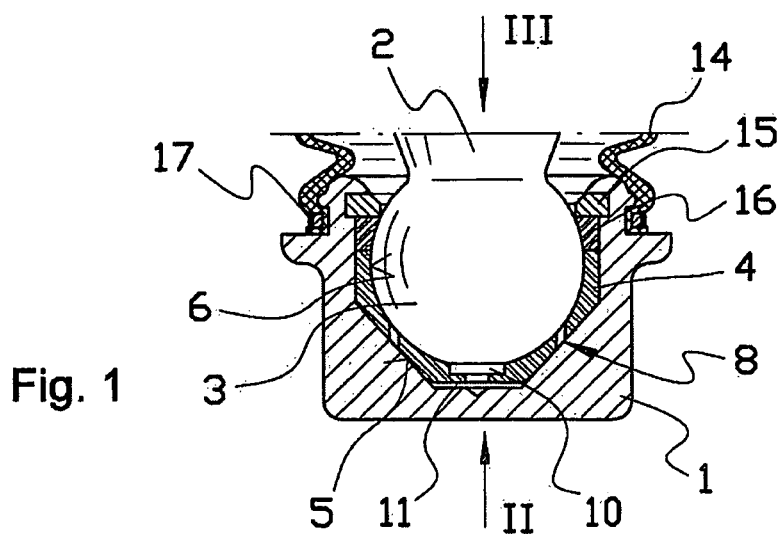
FIG. 1 shows a cross section through an articulated unit implemented as a ball joint.
Figure 4:
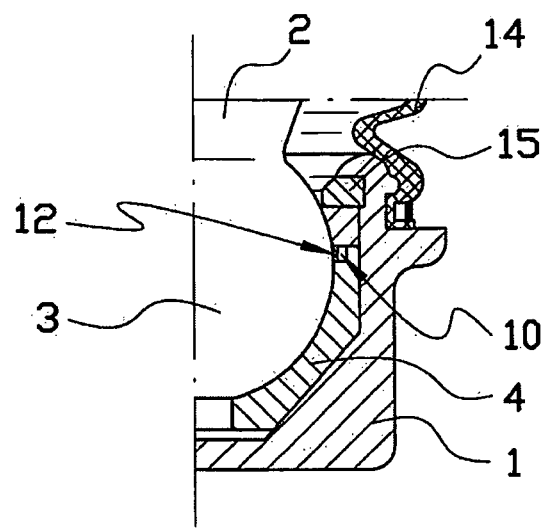
FIG. 4 shows schematically a detail of another embodiment of an articulated unit according to the invention implemented as a ball joint.
Figure 5:
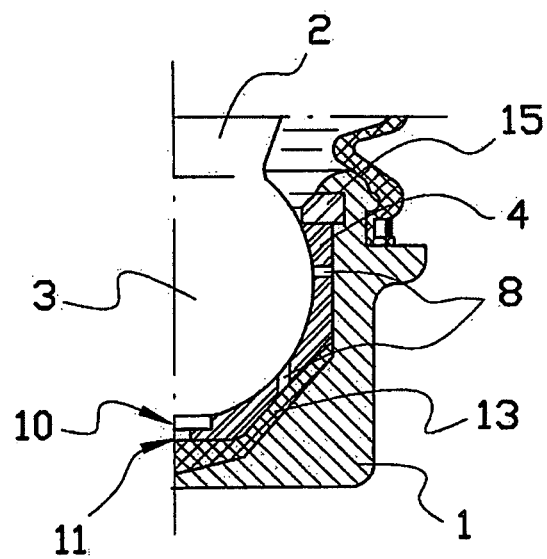
FIG. 5 shows a third variant of an exemplary embodiment of an articulated unit according to the invention.

The ball joint shown as a simplified embodiment in FIG. 1 represents an articulated unit according to the invention for a motor vehicle and includes a housing 1, with a link pin 2 rotationally and pivotally supported in housing 1. The section of the link pin 2 supported in the housing 1 includes a bearing section 3 formed as an articulated ball. A bearing shell 4 is disposed between the bearing section 3 and the housing 1, which is in the present example made of a plastic material with limited elasticity. Both the outer surface 5 and the inner surface 6 of the bearing shell 4 include recesses 7 and 9, respectively, which will be described in more detail in the following Figures. These recesses 7, 9 are components of a lubricant channel system, wherein the recesses 7 in the inner surface 6 of the bearing shell 4 are connected with the recesses 9 disposed in the outer surface 5 of the bearing shell 4 by way of several openings 8. The openings 8 are implemented as bores that completely penetrate the bearing shell. The lower section of housing 1 has a lubricant reservoir 11. The bearing shell 4 also has in its lower region a lubricant reservoir 10. A lubricant is introduced into these lubricant reservoirs 10, 11. The components are able to move relative to one another depending on the design of the articulated unit, so that for example the link pin 2 can rotate in the bearing shell 4 or pivot about its longitudinal axis, as illustrated in FIGS. 4 and 5. The longitudinal axis is not labeled with a reference symbol. Due to the limited elasticity of the bearing shell 4, the link pin 2 can move slightly relative to the housing 1. Lubricant can be supplied by the pumping action produced by the relative movement of the mutually movable components to all contact regions between the bearing section 3 and the bearing shell 4 via the lubricant channel system, so that the contact regions are continuously supplied with lubricant, thereby reducing friction in the articulated unit. A sealing bellow 14 which is secured on the outside of the housing with a clamping ring 17 is used to seal the components of the articulated unit that move relative to one another. A reservoir with lubricant for lubricating the articulated unit is formed inside the sealing bellow 14. The articulated unit illustrated in FIG. 1 in a cross-sectional view and implemented as a ball joint has the characteristic property that the bearing shell 4 is secured in the housing 1 by an upper part 16 which forms a component of the multi-part bearing shell 4, and by a retaining ring 15. The components of the articulated unit are fixed in the axial direction by reshaping a housing section, thereby securing the retaining ring 15 in the housing 1.

Figure 2:
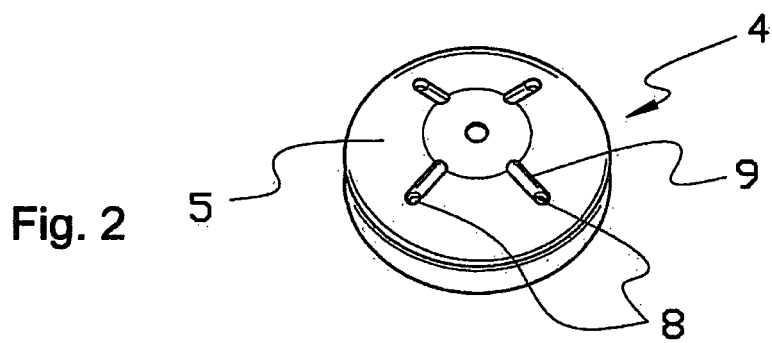
FIG. 2 shows a three-dimensional view of the individual components of a bearing shell in the direction of arrow II of FIG. 1.

FIG. 2 shows as a single part a perspective view of a bearing shell 4 in the direction of arrow II in FIG. 1. The illustration in FIG. 2 corresponds to the view onto the outer surface 5 of the bearing shell 4. The outer surface 5 has recesses 9 which transition into the openings 8. The openings 8 are implemented as bores and completely penetrate the bearing shell 4. The recesses 9 as well as the openings 8 are components of a lubricant channel system which terminates in the lubricant reservoirs 10, 11 disposed in the bearing shell and in the housing, respectively.

Figure 3:
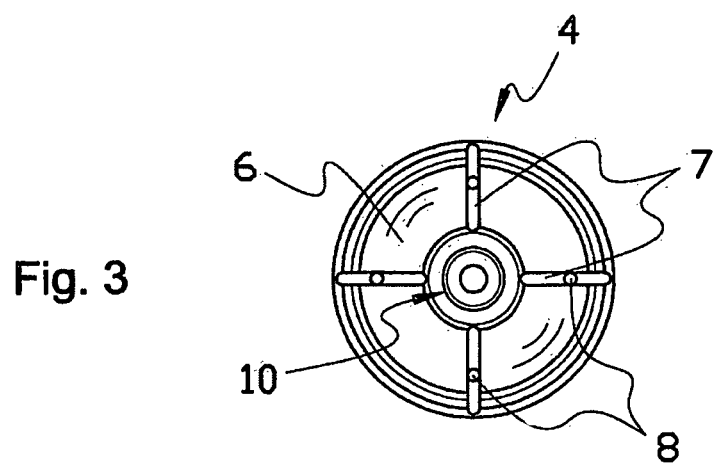
FIG. 3 shows a three-dimensional view of a bearing shell in the direction of arrow III of FIG. 11

The view shown in FIG. 3 corresponds to the arrow III in FIG. 1 and represents a view into the bearing shell 4 as a single part. The inner surface 6 of the bearing shell 4 visible in FIG. 3 has, like the outer surface 5, recesses 7 and openings 8 within the recesses 71 wherein the openings 8 completely penetrate the bearing shell 4 as through bores in the aforedescribed manner and form in conjunction with the corresponding recesses 9 in the outer surface 5 of the bearing shell a lubricant channel system. The recesses 7 in the inner surface of the bearing shell 4 also terminate in a lubricant reservoir 10 disposed in the bearing shell 4.

FIG. 4 illustrates a particularly simple embodiment of a solution according to the invention. A bearing shell 4 having a one-part construction is inserted in the housing 1 of the articulated unit constructed as a ball joint. In this approach, a lubricant reservoir 10 is disposed directly in the bearing shell 4 and is integrally formed in the bearing shell 4 as a groove-shaped recess. A membrane 12 sealing the lubricant reservoir 10 is provided in the contact region between the spherical bearing section 3 of the link pin 2 and the bearing shell 4 as an elastically deformable section with a very small cross-section. The relative movement of the bearing section 3 with respect to the bearing shell 4 enables section 12 to move, so that the lubricant residing behind the section 12 is pumped from the lubricant reservoir 10 into the contact region between bearing section 3 and housing 1. It need not be specifically mentioned that this embodiment illustrated in FIG. 4 also includes a lubricant channel system consisting of the aforedescribed recesses 7 and 9 and the openings 8 connecting the recesses 7 and 9. The lubricant channel system is not shown in FIG. 4 to simplify the drawing.

An embodiment similar to that illustrated in FIG. 4 can also be used for directly supporting the bearing section 3 in housing 1, wherein the lubricant reservoir 11 would here be housed in a cavity of housing 1, and section 12 would be formed directly on the housing 1 as an integral component of housing 1. The illustration of FIG. 4 is therefore intended to show only the component pair consisting of bearing section 3 and bearing shell 4. This applies likewise to the component pair consisting of bearing section 3 and housing 1, wherein the bearing shell 4 has been omitted and the lubricant channel system is directly formed in the inner surface of the housing.

FIG. 5 shows a third variant of a possible embodiment for an articulated unit according to the invention. This variant has as a particular feature also a one-piece bearing shell 4 which is, as already described in conjunction with FIG. 1, supported inside the housing 1 by a retaining ring 15 and a reshaped partial region of the housing 1. The bearing shell 4 movably receives the ball-shaped bearing section 3 of the link pin 2, so that these components are able to move relative to one another. In the embodiment of FIG. 5, several openings 8 are distributed in relation to the longitudinal axis of the link pin 2 about the periphery of the bearing shell 4 and implemented as through bores extending in the radial and axial directions. As described above, these form components of a lubricant channel system, wherein for sake of simplicity of the drawing, the recesses 7, 9 in the bearing shell 4 are not shown in FIG. 5. This embodiment also includes a lubricant reservoir 10 disposed in the lower section of the bearing shell 4 and another lubricant reservoir 11 disposed in the housing 1. The bearing shell 4 is here designed to be slightly compliant in the axial direction, i.e., in the longitudinal axis of the undeflected link pin 2. The axial compliance can be improved in addition to the inherent elasticity of the bearing shell 4 by providing between the housing 1 and the bearing shell 4, i.e., as illustrated in the lower region of the bearing shell 4, an insert 13 made of an elastomeric material. In the present example, this insert is made of a rubber damping element inserted in the housing 1. Under the influence of an axial force, which is applied on the bearing shell 4 through the link pin 2, the insert 13 is compressed and thereby enables an evasive movement of the bearing shell 4, without destroying the bearing shell 4. Advantageously, this embodiment can also significantly improve the pumping action of the lubricant within the lubricant channels system, because the overall elasticity of the articulated components is greater than in other embodiments of such articulated units. The link pin 2 can here move relative to the bearing shell 4, and the bearing shell 4 can move relative to the housing 1.

The invention claimed is:

1. An articulated unit for a motor vehicle with a housing (1) comprising:
    a link pin (2) including a bearing section (3) supported in the housing (1) and a non-bearing section not supported in the housing (1),
    a bearing shell (4) disposed between the housing (1) and the bearing section (3) of the link pin (2), the bearing shell (4) having on an inner surface (6) of the bearing shell facing the bearing section (3) of the link pin (2) a plurality of inner grooves (7) for a lubricant, wherein the bearing shell (4) comprises a plurality of bores (8) which extend through the bearing shell (4) from the inner surface (6) to the outer surface (5) and forms a flow channel; wherein the bearing shell (4) comprises on its outer surface (5) a plurality of outer grooves (9) for the lubricant; the inner grooves (7) on the inner surface (6) of the bearing shell and the outer grooves (9) on the outer surface (5) of the bearing shell are connected in a longitudinal direction of the link pin (2) by way of the plural bores (8), wherein the inner grooves (7) and the outer grooves (9) each having a length, wherein each groove length extends in a radial direction from the longitudinal axis of the bearing shell (4), wherein an inner surface of the bearing shell (4) is spherical in shape to conform to the outer surface (5) of the bearing section (3), wherein the non-bearing section extends from a first side of the bearing section (3), wherein the plural bores (8) are formed in a portion of the bearing shell (4) that engages a second side of the bearing section (3), the first side is opposite to the second side.

2. The articulated, unit according to claim 1, wherein the inner and outer grooves (7, 9) and the plural bores (8) are components of a lubricant channel system of the bearing shell (4).

3. The articulated unit according to claim 2, wherein the articulated unit comprises at least one lubricant reservoir (10, 11) disposed in the housing (1) or as a part of the bearing shell (4).

4. The articulated unit according to claim 3, wherein the lubricant channel system is connected with the lubricant reservoir (10, 11).

5. The articulated unit according to claim 4, wherein the lubricant channel system has a venting functionality.

6. The articulated unit according to claim 5, wherein the bearing shell (4) or the housing (1) comprises at least one membrane section (12) having a small, elastically deformable cross-section representing, an openable seal for a portion of the lubricant reservoir (11) that is closed by the at least one membrane section (12).

7. The articulated unit according to claim 6, wherein elastically compliant inserts (13) are disposed in the articulated unit.

8. The articulated unit according to claim 7, wherein the inserts (13) are made of an elastomeric material.

9. The articulated unit according to claim 7, wherein the inserts (13) are inserted in recesses between the housing (1) and the bearing shell (4).

10. The articulated unit according to claim 7, wherein the inserts (13) are made of a material that are heatable into a liquid state and are vulcanized or spray-coated on the bearing shell (4) and/or the housing (1).

11. The articulated unit according to claim 10, wherein the bearing shell (4) is made of elastically deformable plastic.

12. The articulated unit according to claim 11, wherein the bearing shell (4) is made of several parts.

13. The articulated unit according to claim 3, wherein the articulated unit comprises at two lubricant reservoirs, one lubricant reservoir (11) is disposed in the housing (1) while another lubricant reservoir (10) is part of the bearing shell (4).

14. The articulated unit according to claim 1, wherein the articulated unit is a ball joint for a motor vehicle and the bearing section (3) is an articulated ball.

15. The articulated unit according to claim 1, wherein each of the plural inner grooves (7) on the inner surface is in fluid communication with a different one of the plural outer grooves (9) on the outer surface via a different one of the plural bores (8).

16. The articulated unit according to claim 1, wherein the plural inner grooves (7) and the plural outer grooves (9) do not extend through the bearing shell (4) from its inner surface (6) to its outer surface (5).

* * * * *